United States Patent
Yokoi et al.

(10) Patent No.: US 8,245,672 B2
(45) Date of Patent: Aug. 21, 2012

(54) SINGLE-CYLINDER OR IN-LINE MULTI-CYLINDER ENGINE AND STRADDLE-TYPE VEHICLE PROVIDED WITH THE SAME

(75) Inventors: Masato Yokoi, Shizuoka-ken (JP);
Shidehiko Miyashiro, Shizuoka-ken (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 465 days.

(21) Appl. No.: 12/447,072

(22) PCT Filed: Nov. 15, 2007

(86) PCT No.: PCT/JP2007/072205
§ 371 (c)(1),
(2), (4) Date: Apr. 24, 2009

(87) PCT Pub. No.: WO2008/059932
PCT Pub. Date: May 22, 2008

(65) Prior Publication Data
US 2009/0320785 A1    Dec. 31, 2009

(30) Foreign Application Priority Data
Nov. 15, 2006    (JP) .................................. 2006-308757

(51) Int. Cl.
*F02B 75/24* (2006.01)
(52) U.S. Cl. ............... 123/53.1; 123/193.2; 123/51 BB; 180/291
(58) Field of Classification Search ............... 123/193.5, 123/193.2, 51 BB, 53.1; 180/291, 292, 293
See application file for complete search history.

(56) References Cited

U.S. PATENT DOCUMENTS

| | | | | |
|---|---|---|---|---|
| 4,637,354 A | * | 1/1987 | Tominaga et al. | 123/54.4 |
| 4,798,254 A | * | 1/1989 | Lings | 180/58 |
| 4,945,866 A | * | 8/1990 | Chabot, Jr. | 123/53.1 |
| 5,109,943 A | | 5/1992 | Crenshaw et al. | |
| 5,186,127 A | * | 2/1993 | Cuatico | 123/53.1 |
| 5,515,940 A | * | 5/1996 | Shichinohe et al. | 180/376 |
| 6,186,550 B1 | | 2/2001 | Horii et al. | |
| 6,612,281 B1 | * | 9/2003 | Martin | 123/197.4 |
| 6,637,398 B2 | * | 10/2003 | Suzuki et al. | 123/195 R |
| 6,679,347 B2 | | 1/2004 | Iimuro | |
| 6,729,294 B2 | * | 5/2004 | Okano et al. | 123/198 E |
| 7,188,695 B2 | | 3/2007 | Miyakawa et al. | |
| 7,360,620 B2 | | 4/2008 | Takenaka et al. | |
| 2001/0045312 A1 | | 11/2001 | Adachi et al. | |

(Continued)

FOREIGN PATENT DOCUMENTS
JP    05278661 A  *  10/1993
(Continued)

*Primary Examiner* — Noah Kamen
*Assistant Examiner* — Hung Q Nguyen
(74) *Attorney, Agent, or Firm* — Rabin & Berdo, P.C.

(57) ABSTRACT

A single-cylinder or in-line multi-cylinder engine is provided. The engine includes a crankshaft, a piston, a cylinder body, a cylinder head, and a gear change mechanism. The piston is connected to the crankshaft. A cylinder is formed in the cylinder body. The piston is housed in the cylinder. The cylinder head is attached to an end of the cylinder body. The gear change mechanism is disposed to the rear of the crankshaft. An axis of the cylinder extends upward obliquely to the rear from the crankshaft side. The axis of the cylinder passes in front of an axis of the crankshaft when viewed from a direction in which the crankshaft extends.

13 Claims, 21 Drawing Sheets

U.S. PATENT DOCUMENTS

| | | |
|---|---|---|
| 2002/0027032 A1 | 3/2002 | Tsutsumikoshi |
| 2004/0206566 A1 | 10/2004 | Katsura |
| 2004/0255890 A1* | 12/2004 | Tsutsumi et al. ........ 123/179.24 |
| 2004/0255909 A1* | 12/2004 | Kurokawa et al. ............ 123/472 |
| 2006/0169511 A1 | 8/2006 | Kurokawa et al. |
| 2007/0193805 A1 | 8/2007 | Adachi et al. |

FOREIGN PATENT DOCUMENTS

| | | |
|---|---|---|
| JP | 2002-227601 | 8/2002 |
| JP | 2006-069407 | 3/2006 |
| JP | 2007-022098 | 2/2007 |
| WO | WO-2005/005808 | 1/2005 |

* cited by examiner

SINGLE-CYLINDER OR IN-LINE MULTI-CYLINDER ENGINE AND STRADDLE-TYPE VEHICLE PROVIDED WITH THE SAME

CROSS-REFERENCE TO RELATED APPLICATIONS

This application is a national stage application under 35 U.S.C. §371 of International Application No. PCT/JP2007/072205, filed Nov. 15, 2007, and claims the benefit under 35 U.S.C. §119 of the earlier filing date of Japanese Patent Application 2006-308757, filed Nov. 15, 2006. International Application No. PCT/JP2007/072205 and Japanese Patent Application 2006-308757 are hereby incorporated herein in their entirety by reference.

BACKGROUND OF THE INVENTION

1. Field of the Invention

The present invention relates to a single-cylinder or in-line multi-cylinder engine and a straddle-type vehicle provided with the same.

2. Technical Background

For instance, JP-A-2004-249867 discloses a motorcycle in which an engine is mounted in a manner that a cylinder thereof is inclined rearward. JP-A-2004-249867 discloses that three merits can be obtained by rearward inclination of the cylinder. The first merit is that load distribution on a front wheel can be increased. The second merit is that the body weight can be reduced. The third merit is that traction can be improved with extension of a rear swing arm.

There is a demand for further improved motion performance in a straddle-type vehicle such as a motorcycle. As a method of improving the motion performance, concentration of mass in the engine can be raised, for example. More specifically, there are at least three heavyweight objects in the engine: a cylinder head, a crankshaft, and a gear change mechanism. A method of disposing these three heavyweight objects as close together as possible can be applied. The application of the method causes the cylinder head to be located between the crankshaft and the gear change mechanism. In this way, distances between the center of gravity of the vehicle and the centers of gravity of the cylinder head, the crankshaft, and the gear change mechanism become shorter, and mass is concentrated. As a result, the motion performance can be further improved.

The rearward inclination of the cylinder, as in the motorcycle disclosed in JP-A-2004-249867, can be considered as playing a part in disposing the cylinder head, the crankshaft, and the gear change mechanism in proximity to each other for concentration of mass. However, it is difficult to concentrate the mass merely with the rearward inclination of the cylinder to the gear change mechanism side. Positional interference occurs between the cylinder body and the gear change mechanism when the cylinder is inclined rearward. Therefore, the gear change mechanism has to be disposed away from an axis of the crankshaft in order to incline the cylinder rearward. Because of this, it is difficult to concentrate the mass merely with the rearward inclination of the cylinder. Also, it is difficult to incline the cylinder rearward to a degree that is enough to gain an effect of concentration of mass, without extension of a distance between the gear change mechanism and the axis of the crankshaft.

SUMMARY OF THE INVENTION

The present invention has been made in view of the foregoing, and thus an object thereof is to concentrate the mass in an engine equipped with a crankshaft, a cylinder head, and a gear change mechanism.

The invention relates to a single-cylinder or in-line multi-cylinder engine. The engine according to the invention includes a crankshaft, a piston, a cylinder body, a cylinder head, and a gear change mechanism. The piston is connected to the crankshaft. A cylinder is formed in the cylinder body. The piston is housed in the cylinder. The cylinder head is mounted on an end of the cylinder body. The gear change mechanism is disposed to the rear of the crankshaft. An axis of the cylinder extends upward obliquely to the rear from the crankshaft side. The axis of the cylinder passes in front of an axis of the crankshaft when viewed from a direction in which the crankshaft extends.

The invention further relates to a straddle-type vehicle including the engine described above.

According to the invention, concentration of mass is made possible in an engine equipped with a crankshaft, a cylinder head, and a gear change mechanism.

DETAILED DESCRIPTION OF THE INVENTION

An example of the preferred embodiment of the invention will hereinafter be described, using a motorcycle 1 shown in FIG. 1 as an example. However, a straddle-type vehicle according to the invention is not limited to the so-called off-road type motorcycle 1 shown in FIG. 1. The "straddle-type vehicle" according to the invention means a vehicle on which a rider straddles a seat. Therefore, the straddle-type vehicle according to the invention may be an All Terrain Vehicle (ATV) or the like. The straddle-type vehicle according to the invention may also be a vehicle other than an off-road vehicle. More specifically, the straddle-type vehicle according to the invention may be a motorcycle, a moped, a scooter, or the like. That is, the meaning of "motorcycle" as used herein includes: a motorcycle proper; a moped; a scooter; an off-road vehicle; and the like. In addition, the meaning of "motorcycle" as used herein includes a vehicle that has a plurality of wheels at least either in the front or in the rear thereof and that changes a traveling direction by tilting a vehicle body.

Forward, rear, left, and right directions in the following descriptions denote directions as viewed from the rider seated on a seat 26.

First Embodiment (General Construction of Motorcycle 1)

Figure 1:
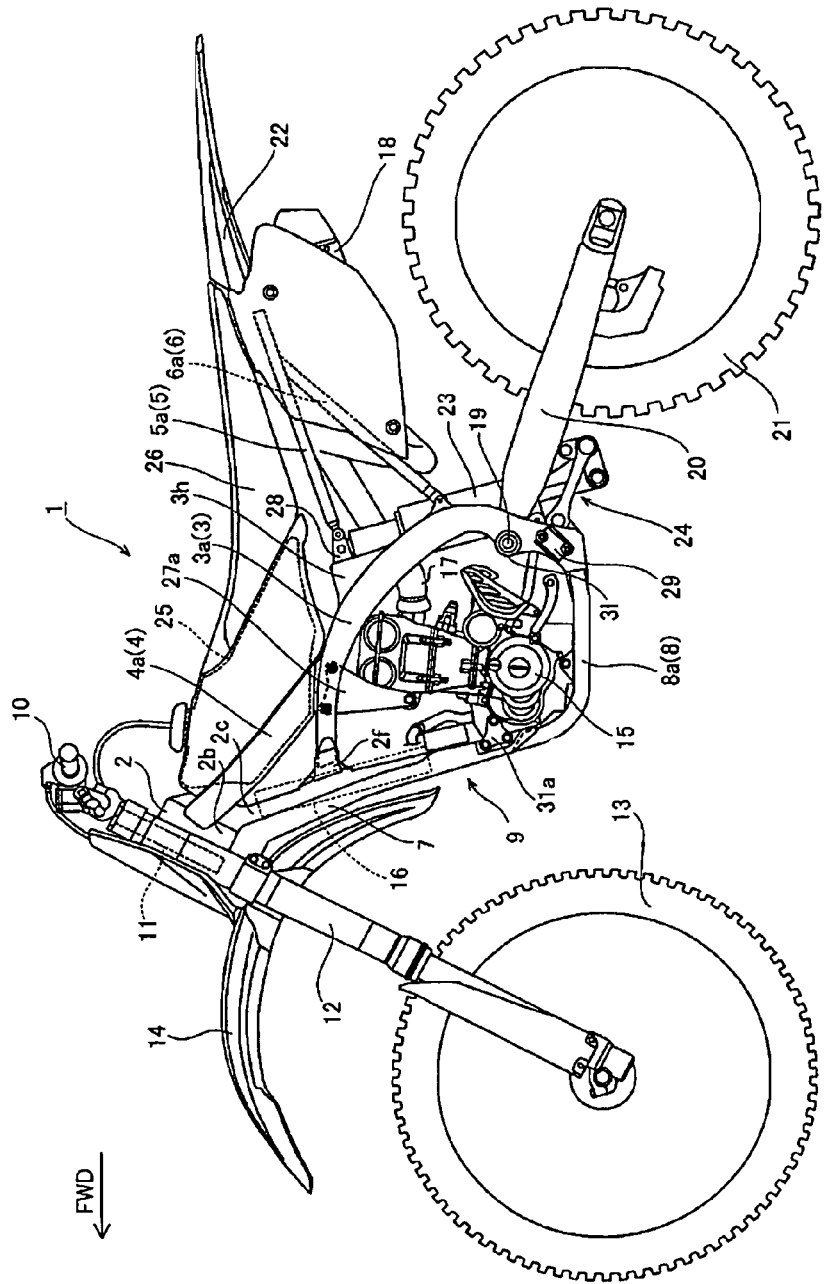
FIG. 1 is a side view showing an overall structure of a motorcycle according to a first embodiment.
Figure 2:
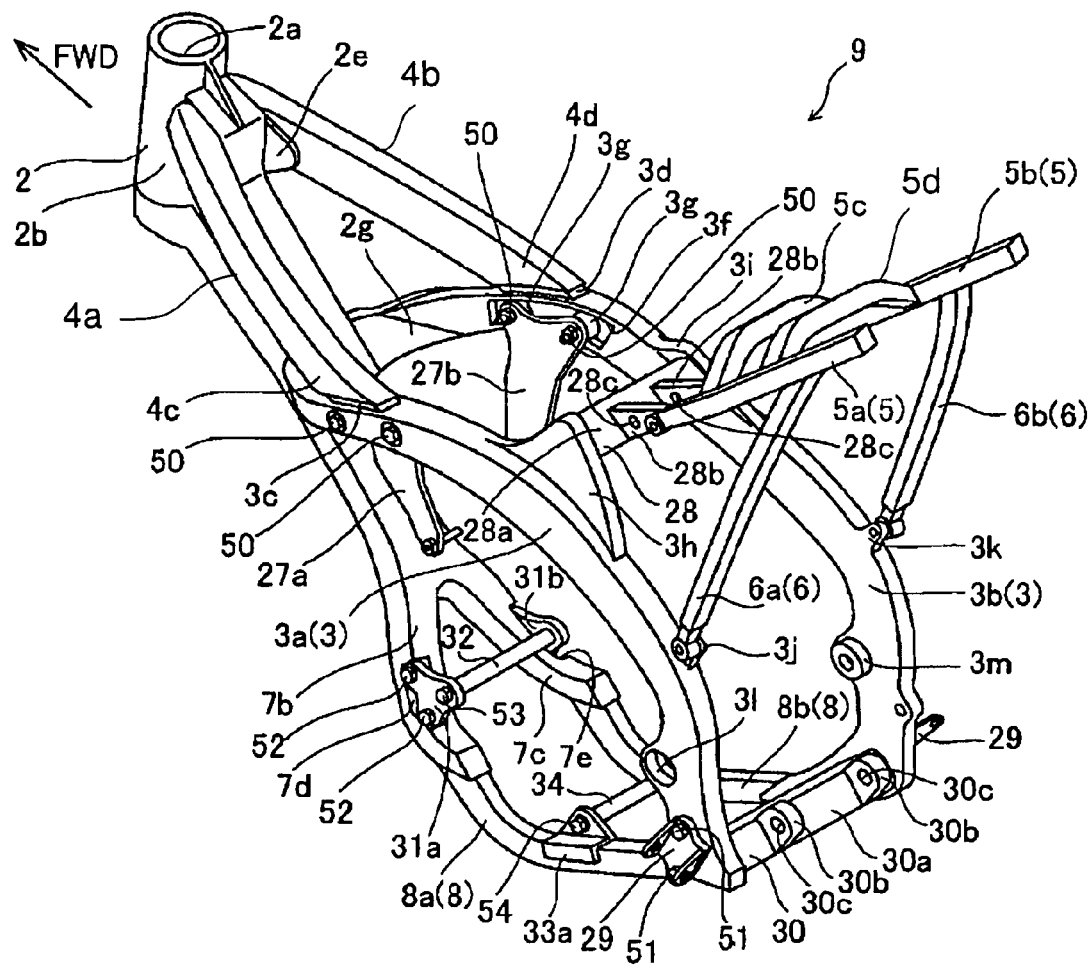
FIG. 2 is a perspective view showing a body frame of the motorcycle according to the first embodiment.
Figure 3:
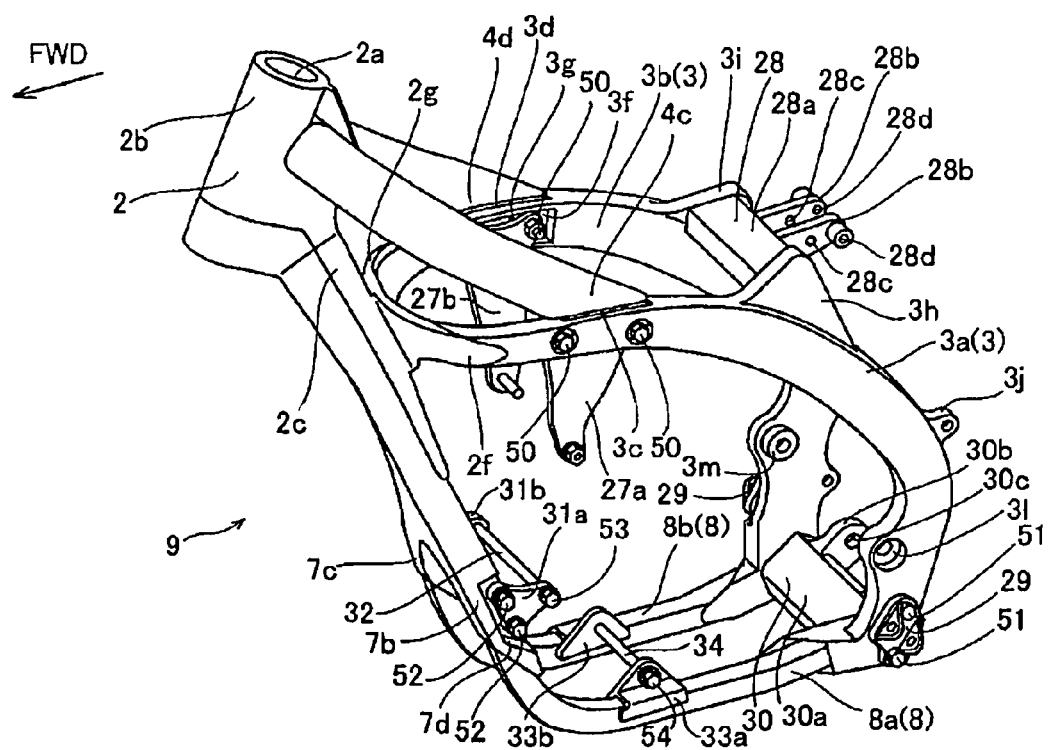
FIG. 3 is a perspective view showing a main frame and its surroundings, for the motorcycle according to the first embodiment.

As shown in FIGS. 1 to 3, the motorcycle 1 has a body frame 9. The body frame 9 includes a head pipe 2, a main frame 3, a tank rail 4, a seat rail 5, a backstay 6, a down frame 7, and a lower frame 8.

The head pipe 2 is disposed at the front end of the body frame 9. The main frame 3 is connected to the head pipe 2. The main frame 3 extends slightly downward to the rear from the head pipe 2. The main frame 3 is bent in the middle and extends approximately downward therefrom.

The tank rail 4 is disposed between the head pipe 2 and the main frame 3. A front end of the tank rail 4 is connected to the head pipe 2. Meanwhile, a rear end of the tank rail 4 is connected to the main frame 3. A resinous fuel tank 25 is disposed above the tank rail 4. The fuel tank 25 is disposed such that it is held between a left tank rail 4a and a right tank rail 4b (see FIG. 2), which together constitute the tank rail 4. The seat 26 is disposed behind the fuel tank 25.

The seat rail 5 is connected to the middle of the main frame 3. The seat rail 5 extends slightly upward to the rear from the main frame 3. A rear end of the seat rail 5 is connected to a rear end of the main frame 3 through the backstay 6.

The down frame 7 is connected to the head pipe 2. The down frame 7 extends downward to the rear from the head pipe 2 in a position below the main frame 3. A rear end of the down frame 7 and the rear end of the main frame 3 are connected through the lower frame 8.

As shown in FIG. 1, a steering shaft, not shown, is rotatably inserted in the head pipe 2. Handlebars 10 are mounted on top of the steering shaft. A pair of front forks 12 extending obliquely downward to the front is attached to the steering shaft. A front wheel 13 is rotatably attached to lower ends of the paired front forks 12. A front fender 14 is disposed above the front wheel 13. The front wheel 13 is covered by this front fender 14 from above.

A pivot shaft 19 is attached to the rear end of the main frame 3. A rear arm 20 is swingably attached to the pivot shaft 19. A rear wheel 21 is rotatably attached to a rear end of the rear arm 20. The rear arm 20 is connected to an end of a rear suspension 23 via a coupling member 24. The other end of the rear suspension 23 is connected to the main frame 3. Shocks from the vertical swings of the rear arm 20 are absorbed by this rear suspension 23.

A rear fender 22 is disposed above the rear wheel 21. The rear wheel 21 is covered by this rear fender 22 from above.

As shown in FIG. 1, an engine 15 is mounted in an area surrounded by the main frame 3, the down frame 7, and the lower frame 8 in a side view. A radiator 16 is disposed in front of and above the engine 15. The radiator 16 is arranged to extend downward slightly to the rear. The engine 15 is cooled down by a function of the radiator 16. An exhaust pipe 17 is connected to a rear portion of the engine 15. The exhaust pipe 17 extends rearward from the engine 15. The exhaust pipe 17 is connected to a muffler 18.

(Detailed Construction of Body Frame 9)

In the first embodiment, the head pipe 2 is made of aluminum. The head pipe 2 is formed by semi-solid die casting. Semi-solid die casting is a method of forming a metal member by die casting metal that is a mixture of a liquid and solid phase. The utilization of semi-solid die casting can improve the strength of moldings, as compared to the utilization of a conventional casting method.

Figure 6:
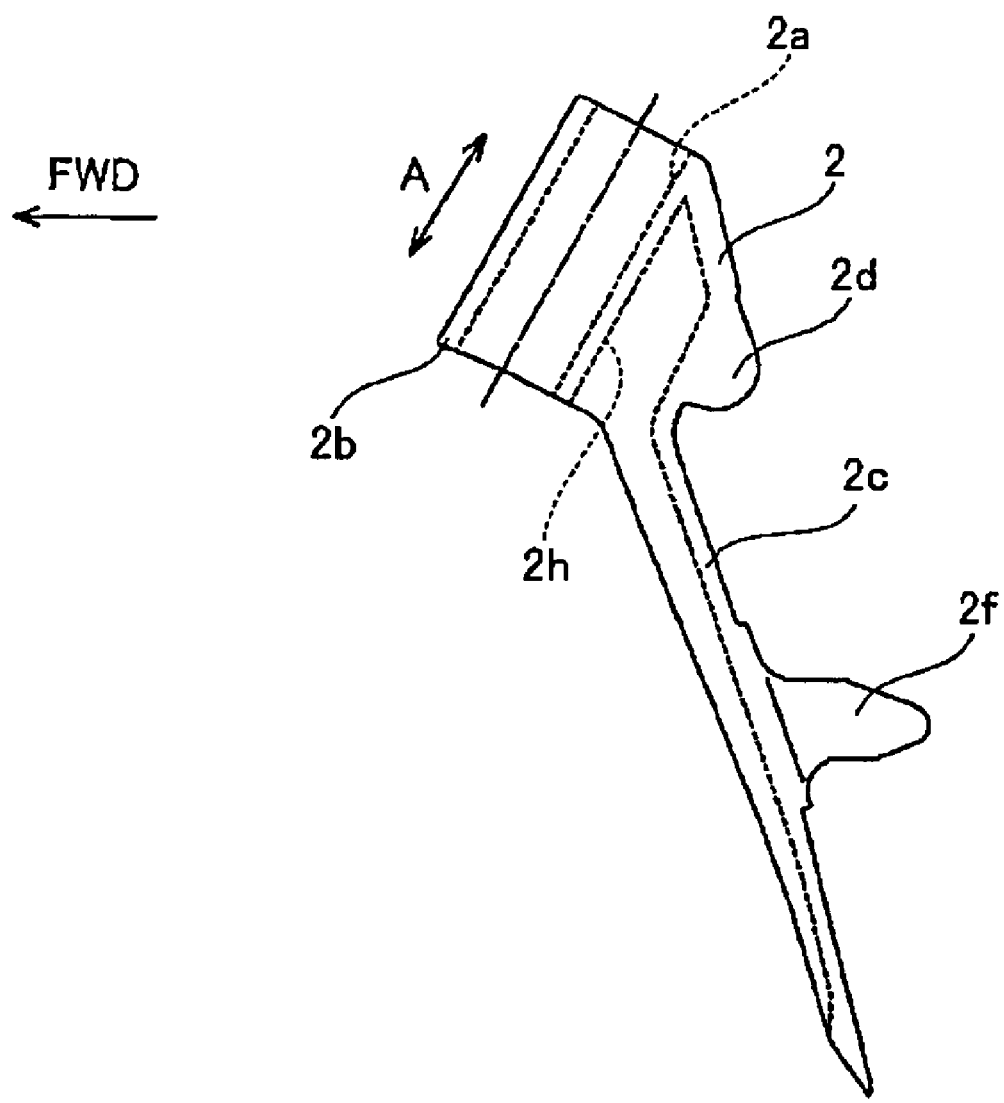
FIG. 6 is a side view showing a head pipe structure of the motorcycle according to the first embodiment.

As shown in FIG. 6, the head pipe 2 includes a cylindrical section 2b and a body section 2c. An insertion hole 2a is formed in the cylindrical section 2b. The insertion hole 2a extends in a predetermined direction A. The body section 2c is located at the rear of the cylindrical section 2b. The body section 2c extends in a downward direction.

Figure 5:
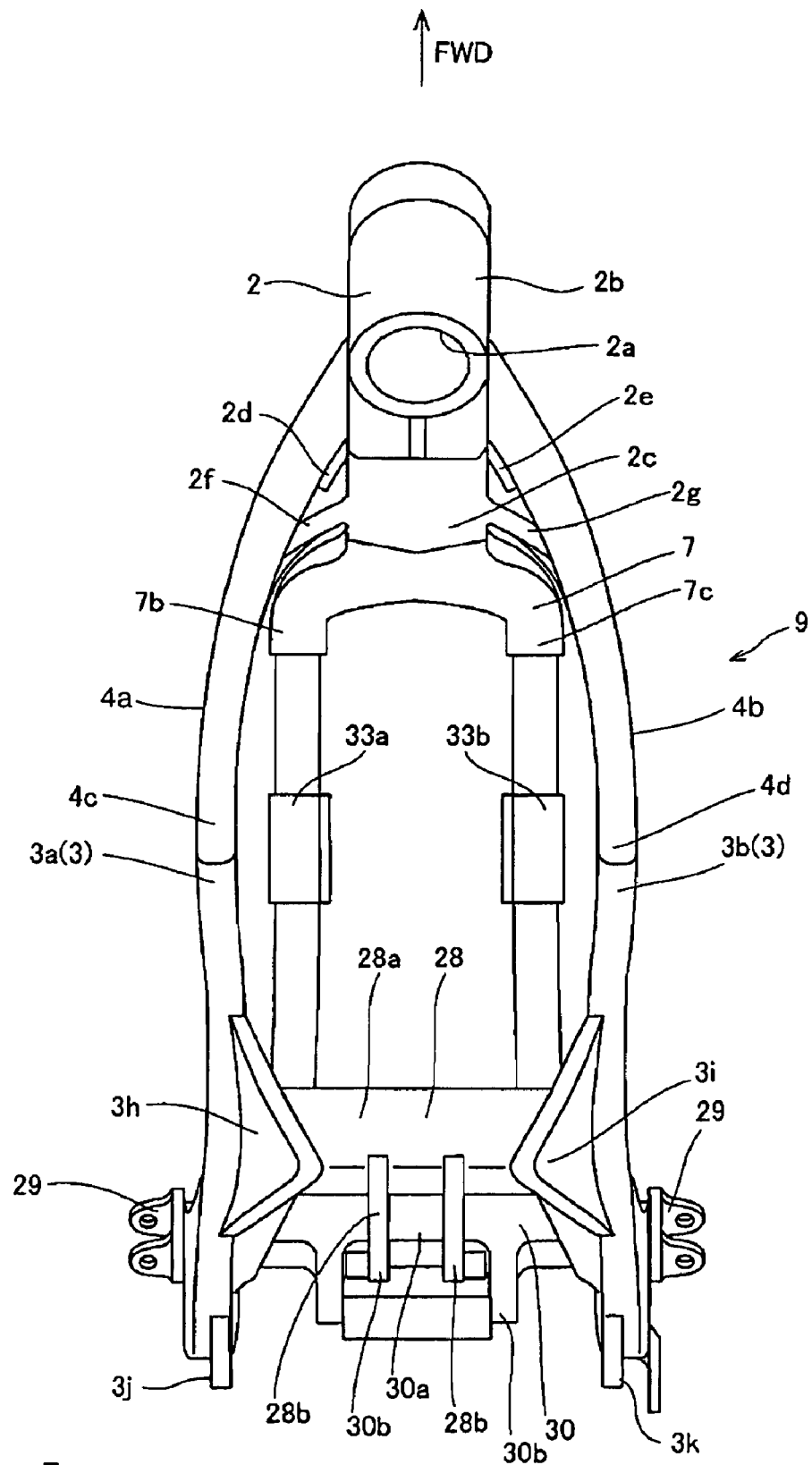
FIG. 5 is a plan view showing the main frame and its surroundings, for the motorcycle according to the first embodiment.

A weld reinforcement 2d shown in FIG. 5 and FIG. 6, and a weld reinforcement 2e shown in FIG. 2 and FIG. 5, are formed in portions of the body section 2c of the head pipe 2 at the rear of the cylindrical section 2b. The weld reinforcement 2d is formed to project from the left side of the head pipe 2 to the rear. The weld reinforcement 2e is formed to project from the right side of the head pipe 2 to the rear.

A weld part 2f shown in FIG. 6 and a weld part 2g shown in FIG. 2 are formed as frame parts in portions of the head pipe 2 below the weld reinforcements 2d, 2e.

In the first embodiment, the weld reinforcements 2d, 2e, the weld parts 2f, 2g, and the head pipe 2 are integrally formed by semi-solid die casting.

Figure 7:
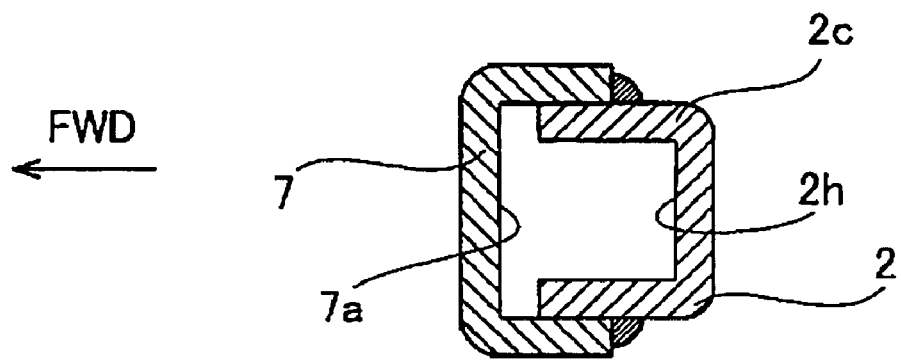
FIG. 7 is a side view taken along the cutout line 100-100 in FIG. 4.

As shown in FIG. 6, a recess 2h is formed in a front portion of the body section 2c. The recess 2h opens in the direction A that the insertion hole 2a extends. Therefore, as shown in FIG. 7, the body section 2c is formed to have a U-shaped cross section.

Like the head pipe 2, the main frame 3 is made of aluminum. Further, like the head pipe 2, the main frame 3 is also formed by semi-solid die casting. As shown in FIGS. 2 and 3, the main frame 3 includes a left frame 3a located on the left side and a right frame 3b located on the right side.

As shown in FIGS. 2 and 5, the left frame 3a and the right frame 3b of the main frame 3 are arranged to extend rearward and to have predetermined spacing therebetween in a vehicle width direction in a plan view. Front ends of the left frame 3a and the right frame 3b are respectively welded to the weld parts 2f, 2g in the body section 2c of the head pipe 2. Therefore, the left frame 3a and the right frame 3b are formed in a U-shape in cross section, in such a way that they approach each other toward the body section 2c of the head pipe 2.

Figure 4:
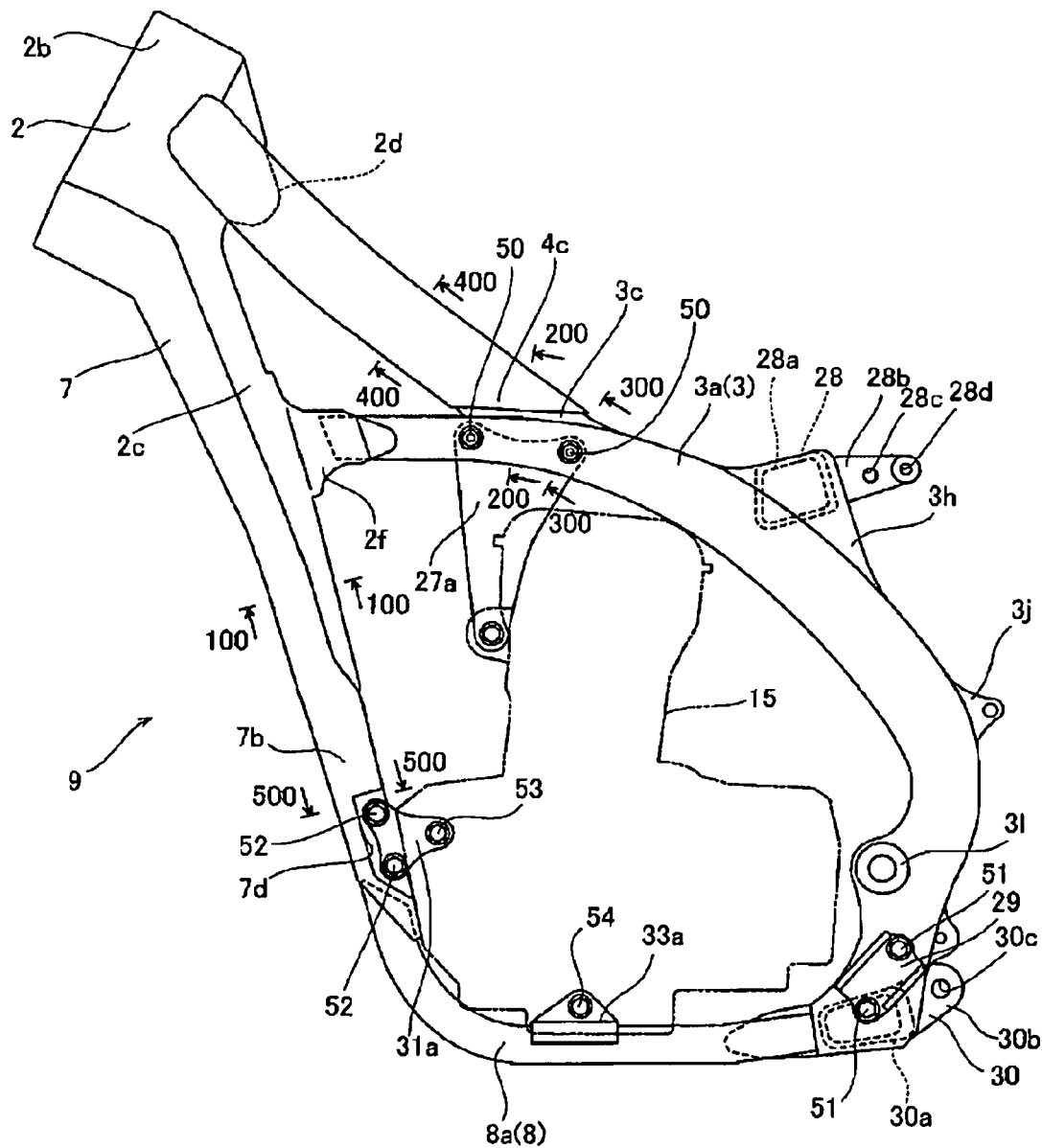
FIG. 4 is a side view showing the main frame and its surroundings, for the motorcycle according to the first embodiment.

As shown in FIGS. 2 and 4, connections 3c, 3d are respectively formed on top of the left frame 3a and the right frame 3b. The tank rail 4 is welded to the connections 3c, 3d. The connections 3c, 3d shown in FIG. 2 are arranged to be fitted to a connection 4c and a connection 4d of the tank rail 4, respectively. The connections 3c, 3d are respectively welded to the connection 4c and the connection 4d. The connections 3c, 3d each have a recess 3e (see FIG. 8) on an inner side of a portion thereof that is fitted to the connections 4c, 4d of the tank rail 4.

Figure 9:
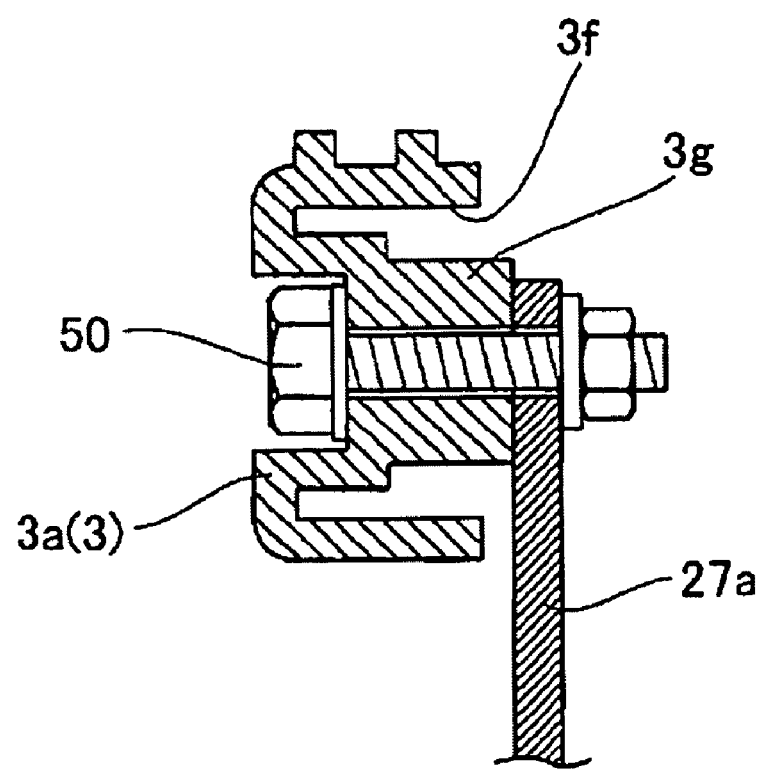
FIG. 9 is a side view taken along the cutout line 300-300 in FIG. 4.

As shown in FIGS. 2 and 9, portions of the left frame 3a and the right frame 3b near the portions thereof to which the tank rail 4 is welded each have a recess 3f and has a U-shaped cross section. A boss 3g is integrally formed on the inside of each recess 3f. As shown in FIG. 4, a left support plate 27a for supporting the engine 15 is provided. As shown in FIG. 2, the left support plate 27a and a right support plate 27b for supporting the engine 15 are fixed to the bosses 3g. The bosses 3g and the support plate 27a as well as the bosses 3g and the support plate 27b are fixed by screws 50.

In the first embodiment, since the main frame 3 is formed by semi-solid die casting, it is possible to integrally form the recesses 3e and the bosses 3g with the main frame 3.

As shown in FIG. 2, bracket weld parts 3h, 3i are integrally formed in the middle of the left frame 3a and of the right frame 3b, respectively, in a longitudinal direction. As shown in FIG. 5, the bracket weld parts 3h, 3i are formed to extend upward to the inside of the body frame 9. Also, as shown in FIGS. 2 and 3, a rear suspension bracket 28 is welded to the bracket weld parts 3h, 3i. An upper section of the rear suspension 23 shown in FIG. 1 is supported by the rear suspension bracket 28.

The rear suspension bracket 28 includes a cross pipe 28a and two attachments 28b. The cross pipe 28a is formed by extrusion. The two attachments 28b are integrally formed with the cross pipe 28a. A rear-suspension support hole 28c and a seat-rail support hole 28d are formed in each of the attachments 28b.

As shown in FIG. 2, attachments 3j, 3k are respectively formed at a portion of the left frame 3a at the rear of the bracket weld part 3h and at a portion of the right frame 3b at the rear of the bracket weld part 3i. The backstay 6 is attached to the attachments 3j, 3k.

Fixing parts 3l, 3m are respectively formed in lower portions of the left frame 3a and the right frame 3b as shown in FIG. 1 and FIG. 2. The pivot shaft 19 is fixed to the fixing parts 3l, 3m.

Still referring to FIGS. 1 and 2, footrest holding plates 29 are respectively fixed with a screw 51 to a portion, lower than the fixing part 3l, of the left frame 3a, and to a portion, lower than the fixing part 3m, of the right frame 3b. A footrest, not shown, is held by the footrest holding plate 29.

As shown in FIG. 2, a coupling member bracket 30 is welded to the left frame 3a and the right frame 3b at their lower ends. The coupling members 24 (see FIG. 1) are attached to the coupling member bracket 30. The coupling member bracket 30 includes a cross pipe 30a and two attachments 30b. The cross pipe 30a is formed by extrusion. The two attachments 30b are integrally formed with the cross pipe 30a. A coupling-member support hole 30c is formed in each attachment 30b.

As shown in FIGS. 3, 4 and 5, the left frame 3a and the right frame 3b are formed to curve inward, toward, e.g., the head pipe 2, so that their lower ends are more forwardly disposed than middle portions thereof.

Figure 10:
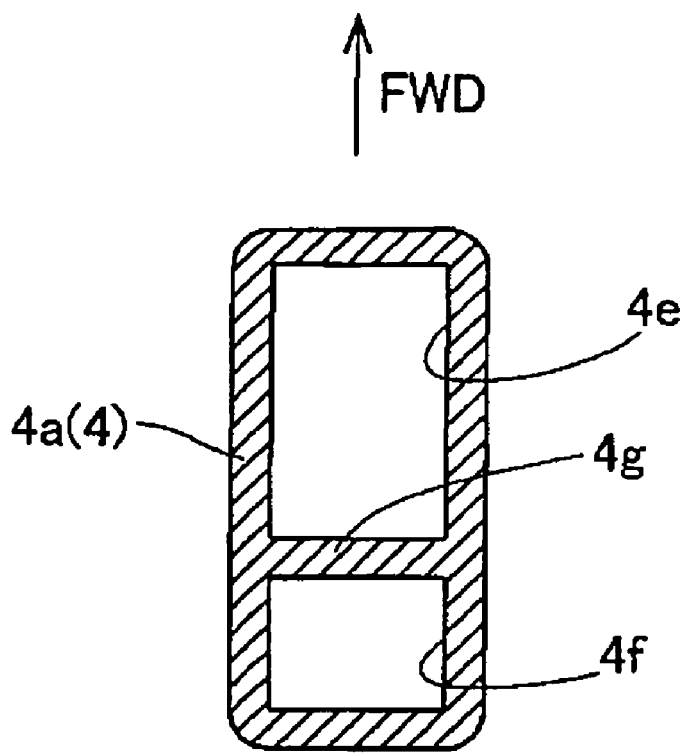
FIG. 10 is a side view taken along the cutout line 400-400 in FIG. 4.

The tank rail 4 is made of aluminum, and formed by extrusion. Referring to FIG. 2, tank rail 4 includes the left tank rail 4a located on the left side and the right tank rail 4b located on the right side. As shown in FIG. 10, the tank rail 4 is formed to be hollow. The tank rail 4 includes a wall 4g. An internal space of the tank rail 4 is divided into a hole 4e and a hole 4f by the wall 4g. At least one of the hole 4e and the hole 4f may communicate with an outside of the tank rail 4.

As shown in FIG. 2 and FIG. 5, the front end of the left tank rail 4a is welded to the upper left of the body section 2c of the head pipe 2 and the weld reinforcement 2d. The connection 4c at the rear end of the left tank rail 4a is welded to the connection 3c of the left frame 3a. The front end of the right tank rail 4b is welded to the upper right of the body section 2c of the head pipe 2 and the weld reinforcement 2e. The connection 4d at the rear end of the right tank rail 4b is welded to the connection 3d of the right frame 3b.

The seat rail 5 includes a left rail 5a located on the left side, a right rail 5b located on the right side, and two reinforcing pipes 5c, 5d. The left rail 5a and the right rail 5b are connected by the two reinforcing pipes 5c, 5d. Front ends of the left rail 5a and the right rail 5b are fixed in the seat-rail support holes 28d in the attachments 28b of the rear suspension bracket 28 (see also FIG. 3).

As shown in FIG. 2, the backstay 6 includes a left stay 6a located on the left side and a right stay 6b located on the right side. Upper ends of the left stay 6a and the right stay 6b are welded to the left rail 5a and the right rail 5b, respectively. Lower ends of the left stay 6a and the right stay 6b are attached to the attachment 3j on the left frame 3a and the attachment 3k on the right frame 3b, respectively.

The down frame 7 is made of aluminum, by forging. As shown in FIG. 4, a rear surface of the down frame 7 is welded to the head pipe 2. As shown in FIG. 7, a recess 7a is formed in a part of the down frame 7 to which the head pipe 2 is welded. The part of the down frame 7 to which the head pipe 2 is welded has a U-shaped cross section.

Figure 11:
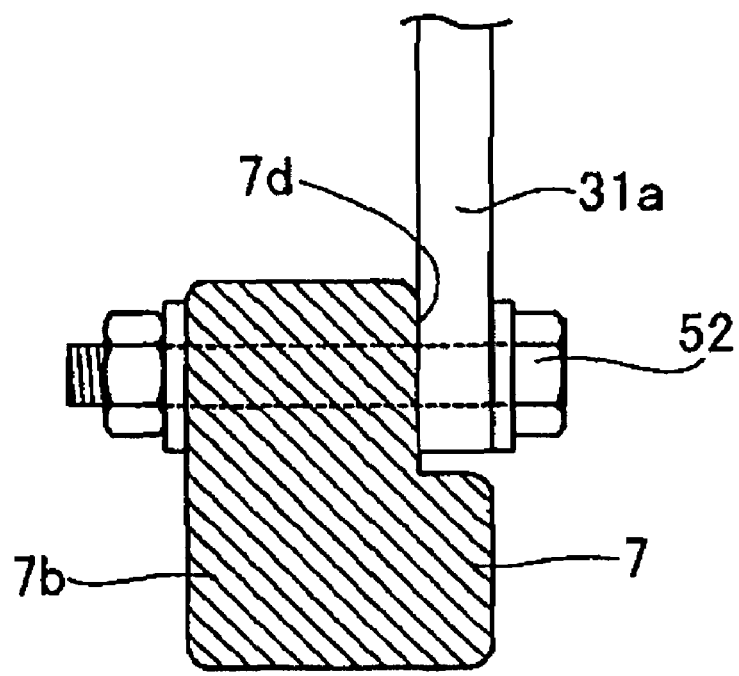
FIG. 11 is a side view taken along the cutout line 500-500 in FIG. 4.

As shown in FIG. 2, a lower part of the down frame 7 is bifurcated into a left frame 7b extending downward to the left and a right frame 7c extending downward to the right. Recesses 7d, 7e are respectively formed in the left frame 7b and the right frame 7c. As shown in FIGS. 2 and 11, support plates 31a, 31b are respectively fixed to the recesses 7d, 7e by screws 52. As shown in FIGS. 2 and 4, a support bar 32 for supporting the engine 15 is fixed to the support plates 31a, 31b with screws 53.

The lower frame 8 is made of aluminum and formed by extrusion. As shown in FIG. 2, the lower frame 8 includes a left lower frame 8a located on the left side and a right lower frame 8b located on the right side. Front ends of the left lower frame 8a and the right lower frame 8b are welded to lower ends of the left frame 7b and the right frame 7c, respectively. As shown in FIG. 3, support plates 33a, 33b are respectively welded to upper surfaces of the left lower frame 8a and the right lower frame 8b. A support bar 34 for supporting the engine 15 is fixed to the support plates 33a, 33b with screws 54. Rear ends of the left lower frame 8a and the right lower frame 8b are welded to front portions of lower ends of the left frame 3a and the right frame 3b, respectively.

(Structure of Engine 15)

Next, the structure of the engine unit 15 will be described with reference to FIGS. 12 to 14. In the first embodiment, the engine 15 is a water-cooled single-cylinder engine. However, the invention is not limited to this construction. The engine 15 may be an in-line multi-cylinder engine. In addition, the engine 15 may be an air-cooled engine. The in-line multi-cylinder engine can be an in-line two cylinder engine.

Figure 12:
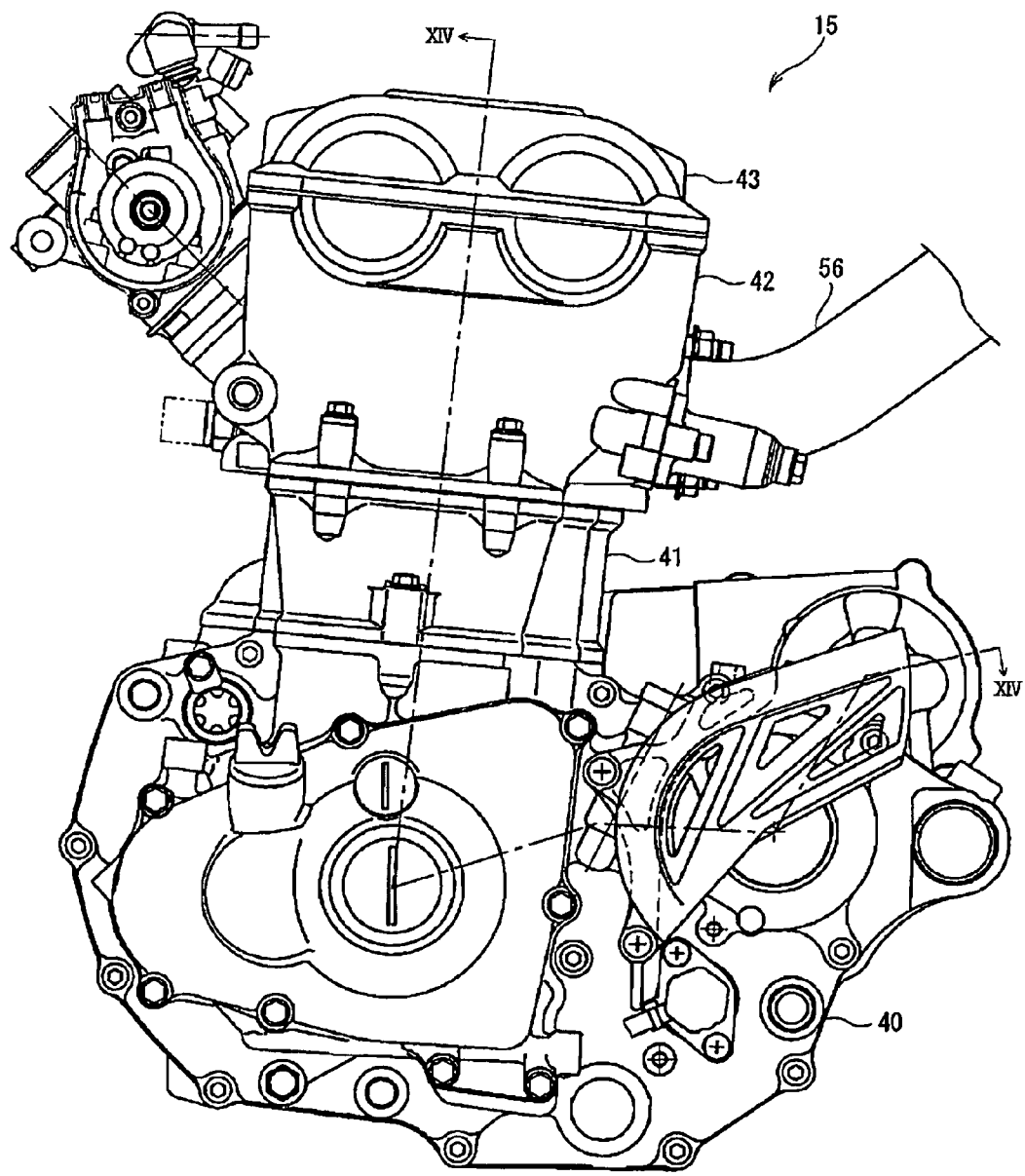
FIG. 12 is an enlarged left side view of an engine according to the first embodiment.
Figure 13:
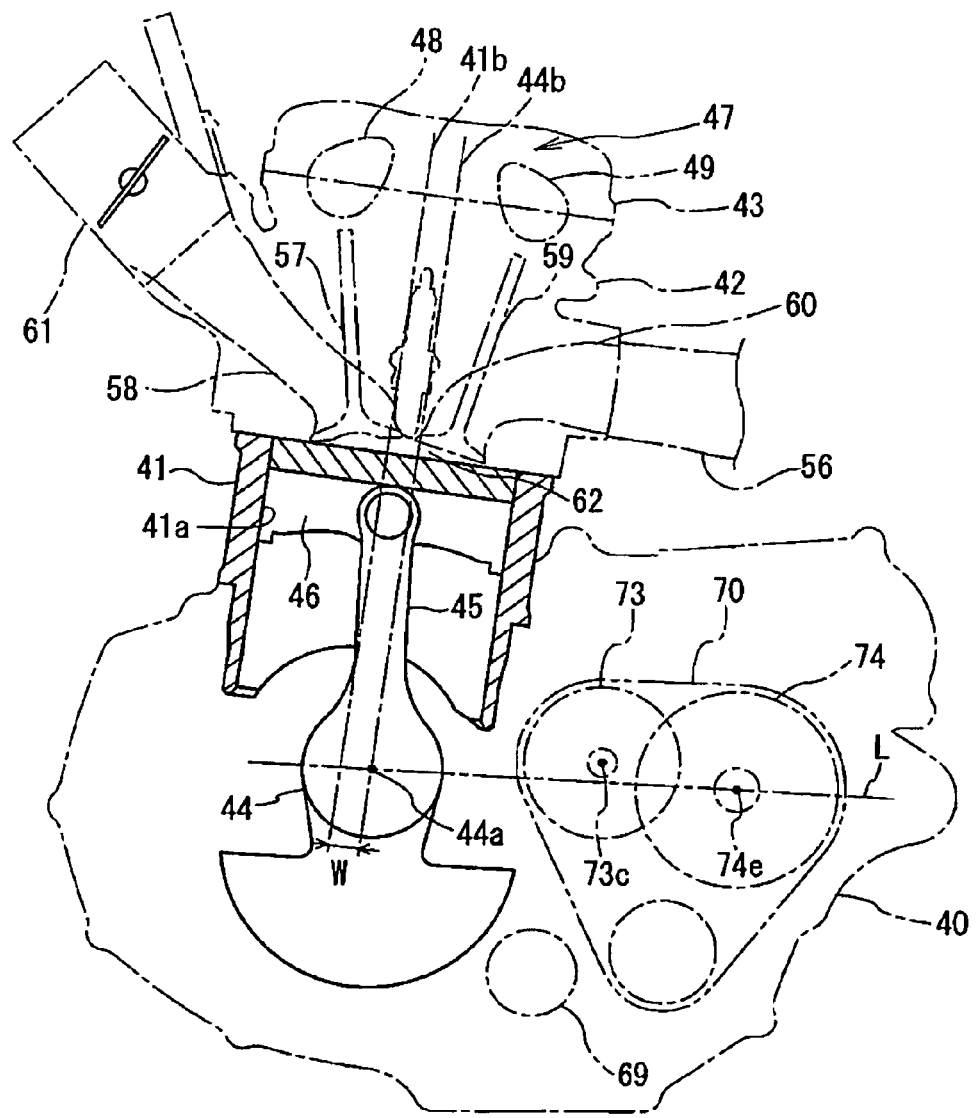
FIG. 13 is a schematic side view of an engine structure according to the first embodiment.

As shown in FIGS. 12 and 13, the engine 15 includes a crankcase 40, a cylinder body 41, a cylinder head 42, a head cover 43 attached to an end of the cylinder head 42, a gear change mechanism 70, and an oil pump 69.

Figure 14:
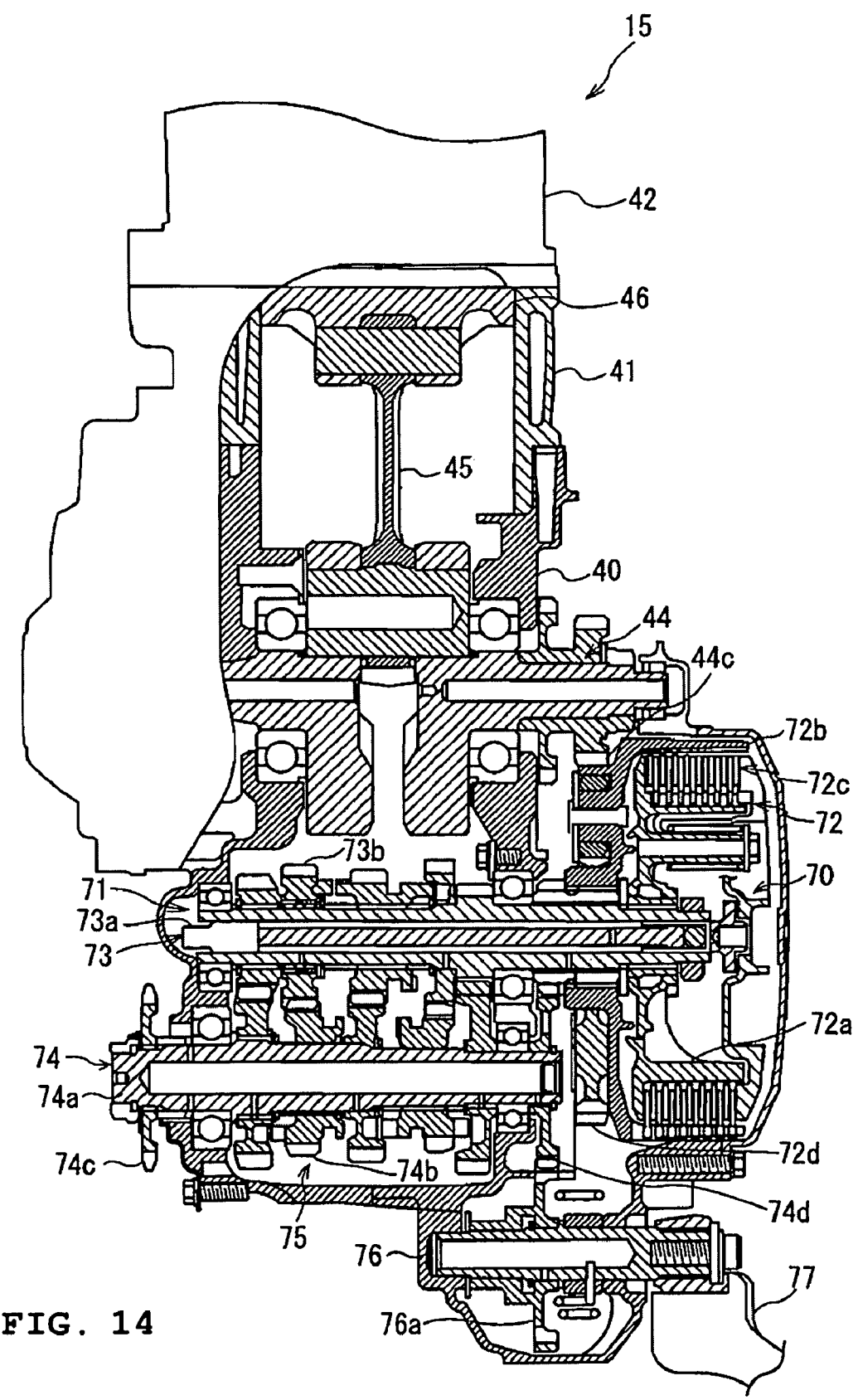
FIG. 14 is a partial sectional view taken along the cutout line XIV-XIV in FIG. 12.

As shown in FIGS. 13 and 14, a crankshaft 44 extending in a vehicle width direction is housed in the crankcase 40. A connecting rod 45 is attached to the crankshaft 44. A piston 46 is attached to an end of the connecting rod 45.

A cylinder 41a in a generally cylindrical shape is formed in the cylinder body 41. The piston 46 is housed in this cylinder 41a. The cylinder body 41 is attached to a front half of the crankcase 40. More specifically, as shown in FIG. 13, the cylinder body 41 is attached to the crankcase 40 in such a way that a lower portion of the cylinder body 41 is located inside the crankcase 40. Therefore, the cylinder 41a extends into the crankcase 40.

In detail, the cylinder body 41 is attached to the crankcase 40 in such a way that the cylinder 41a inclines rearward to the side of the gear change mechanism 70, which will be described later. More specifically, an axis 41b of the cylinder 41a extends upward obliquely to the rear from the crankshaft 44 side. In the view of FIG. 13, the axis 41b of the cylinder passes in front of an axis 44a of the crankshaft 44 when viewed from a direction in which the crankshaft 44 extends. In other words, in the view of FIG. 13, the axis 41b of the cylinder 41a is to be understood as being located in front of (e.g., closer to a viewer than) a straight line 44b that intersects an axis 44a of the crankshaft 44 and is parallel to the axis 41b. A direction in which the crankshaft 44 extends is the same as the vehicle width direction. To dispose a cylinder as described in the foregoing is referred to herein as "to offset the cylinder."

The cylinder head 42 is attached to an end of the cylinder body 41. A valve mechanism 47 is housed in the cylinder head 42. The valve mechanism 47 includes an intake valve 57, an exhaust valve 59, an intake camshaft 48, and an exhaust camshaft 49. The intake valve 57 is driven by the intake camshaft 48. The intake valve 57 opens and closes an intake port 58. The exhaust valve 59 is driven by the exhaust camshaft 49. The exhaust valve 59 opens and closes an exhaust port 60.

A throttle body 61 is attached to the intake port 58. Air and fuel are supplied to a combustion chamber 62 from this throttle body 61 via the intake port 58. Meanwhile, an exhaust pipe 56 is connected to the exhaust port 60. Exhaust gas in the combustion chamber 62 is discharged to the outside through the exhaust port 60 and the exhaust pipe 56.

The gear change mechanism 70 is housed in the crankcase 40. As shown in FIG. 14, the gear change mechanism 70 includes a transmission 71 and a multi-plate clutch 72. The transmission 71 includes a main shaft 73 as an input shaft and a drive shaft 74 as an output shaft.

The clutch 72 is attached to a right end of the main shaft 73. The clutch 72 includes an inner element 72a, an outer element 72b, and a plate group 72c. The plate group 72c includes a plurality of clutch plates and a plurality of friction plates. The clutch plates and the friction plates are arranged so as to alternate. Either the plural clutch plates or the plural friction plates are unable to rotate with respect to the inner element 72a, and the other plates are unable to rotate with respect to the outer element 72b.

The plate group 72c is located between the inner element 72a and the outer element 72b. The plural plates constituting the plate group 72c are brought into contact with each other by pressurizing for rotation transmission between the inner element 72a and the outer element 72b. The outer element 72b is rotatable with respect to the main shaft 73. A gear 72d is fixed to the outer element 72b. The gear 72d meshes with a gear 44c provided on the crankshaft 44. Therefore, the outer element 72b rotates along with the rotation of the crankshaft 44. On the other hand, the inner element 72a is attached to the main shaft 73 in such a way that it is unable to rotate with respect to the main shaft 73. Therefore, once the clutch 72 is engaged, the inner element 72a and the main shaft 73 rotate together with the outer element 72b.

The main shaft 73 includes a main shaft body 73a and a first shift gear group 73b. Meanwhile, the drive shaft 74 includes a drive shaft body 74a and a second shift gear group 74b. The first shift gear group 73b and the second shift gear group 74b mesh with each other. A shift gear pair 75 is composed of the first shift gear group 73b and the second shift gear group 74b. The rotation of the main shaft 73 is transmitted to the drive shaft 74 by the shift gear pair 75 in various change gear ratios.

A sprocket 74c is provided on the left end of the drive shaft 74. A drive chain, not shown, is wound around the sprocket 74c and acts as a power transmission means to the rear wheel 21. Accordingly, the rotation of the drive shaft 74 is transmitted to the rear wheel 21.

A gear 74d is formed at the right end of the drive shaft 74. The gear 74d meshes with a one-way gear 76a provided on a kick shaft 76. Also, a kick pedal 77 is attached to the kick shaft 76. Therefore, when the kick pedal 77 is operated by the rider, the rotation of the kick shaft 76 is transmitted to the crankshaft 44 via the drive shaft 74, the main shaft 73, and the clutch 72.

Next, the arrangement of each constructional member of the engine 15 will be described in detail with reference to FIG. 13.

The gear change mechanism 70 is located to the rear of the axis 44a of the crankshaft 44. Further, the gear change mechanism 70 is located to the rear of the lower end of the cylinder body 41. The upper end of the main shaft 73 is positioned higher than the axis 44a of the crankshaft 44. The upper end of the main shaft 73 is positioned higher than the lower end of the cylinder body 41. In other words, the lower end of the cylinder body 41 is positioned lower than the upper end of the main shaft 73.

An axis 73c of the main shaft 73 is located generally to the rear of the axis 44a of the crankshaft 44. Strictly speaking, the axis 73c of the main shaft 73 is located slightly higher than the axis 44a of the crankshaft 44. The axis 73c of the main shaft 73 is located above a straight line L passing through the axis 44a of the crankshaft 44 and an axis 74e of the drive shaft 74.

(Function and Effect)

As described above, the cylinder 41a is inclined rearward, and the cylinder 41a is offset in the first embodiment. More specifically, the cylinder 41a is disposed in such a way that the axis 41b of the cylinder 41a extends upward and to the rear. At the same time, the cylinder 41a is disposed in such a way that the axis 41b of the cylinder 41a passes in front of the axis 44a of the crankshaft 44 when viewed from the direction in which the crankshaft 44 extends. With this arrangement, concentration of mass in the engine 15 can be realized.

Effects of the above will be hereinafter described in detail with reference to FIGS. 15 to 18.

Figure 15:
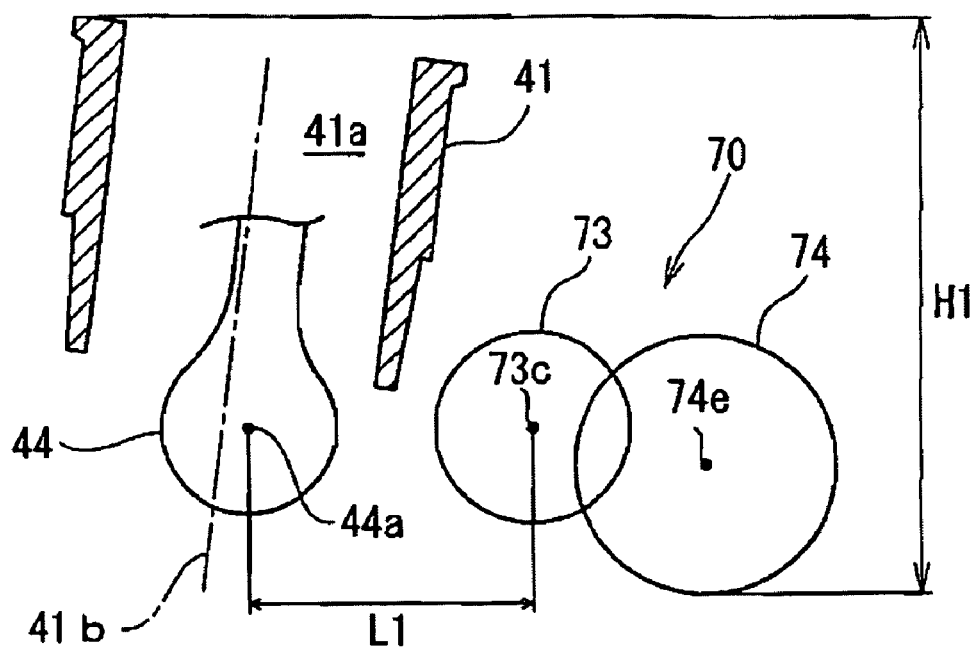
FIG. 15 is a conceptual view showing positional relationships among a cylinder body, a crankshaft, and a gear change mechanism according to the first embodiment.
Figure 16:
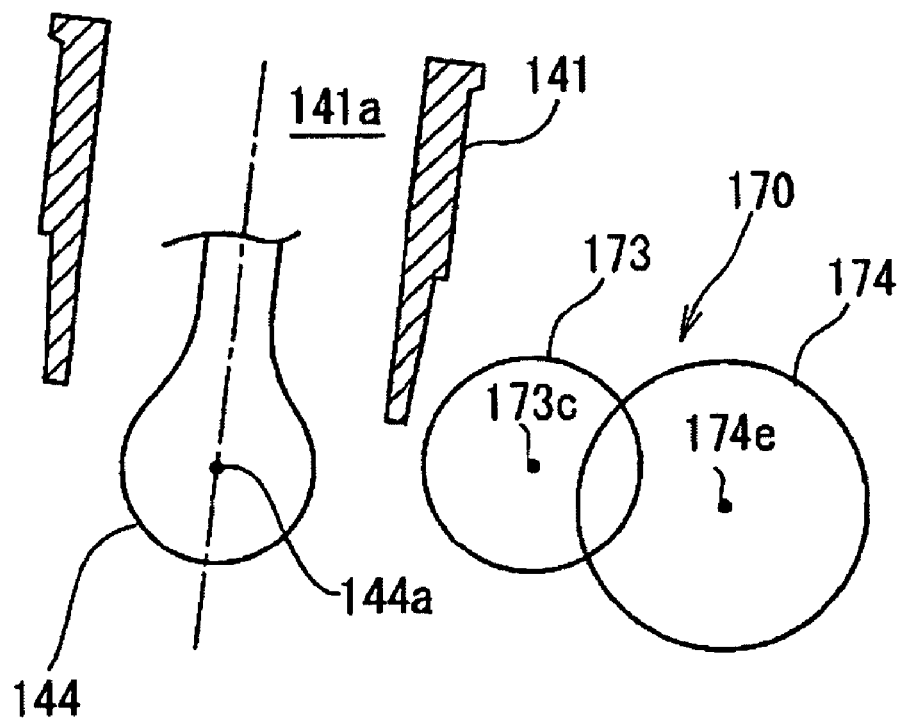
FIG. 16 is a conceptual view showing positional relationships among the cylinder body, the crankshaft, and the gear change mechanism in a first case where a cylinder is not offset.

FIG. 15 is a conceptual view showing positional relationships among the cylinder body 41, the crankshaft 44, and the gear change mechanism 70. FIG. 16 is a conceptual view showing positional relationships among a cylinder body 141, a crankshaft 144, and a gear change mechanism 170 including an axis 174e of a drive shaft 174 when a cylinder 141a is not offset. As shown in FIG. 16, when the cylinder 141a is not offset, the rearward inclination of the cylinder 141a tends to shorten a distance between the cylinder body 141 and the gear change mechanism 170. This may cause the cylinder body 141 to interfere with the gear change mechanism 170 in terms of location. Therefore, it is difficult to sufficiently incline the cylinder 141a rearward. As a result, it is difficult to sufficiently concentrate the mass.

Figure 17:
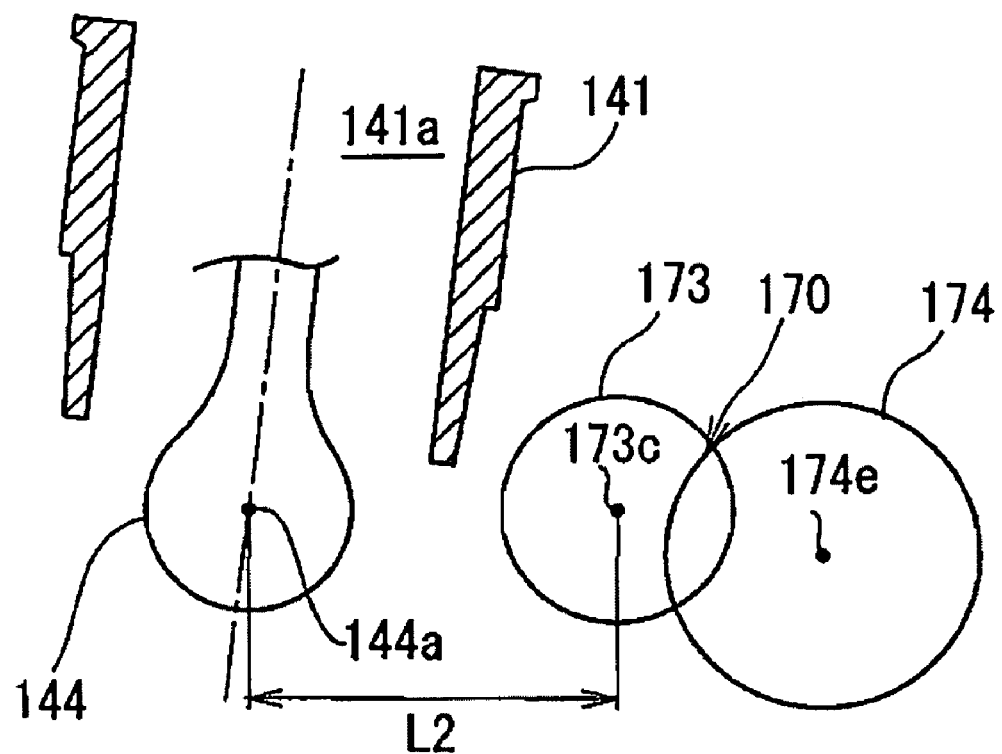
FIG. 17 is a conceptual view showing positional relationships among the cylinder body, the crankshaft, and the gear change mechanism in a second case where the cylinder is not offset.

For instance, if it is attempted to sufficiently incline the cylinder rearward without offsetting the cylinder, the location of the gear change mechanism 170 needs to be changed. More specifically, as shown in FIG. 17, an axis 173c of a main shaft 173 needs to be located away from and to the rear of an axis 144a of the crankshaft 144. Or, the axis 173c of the main shaft 173 needs to be located relatively lower than the axis 144a, as shown in FIG. 18.

For example, as shown in FIG. 17, if the axis 173c of the main shaft 173 is disposed away from and to the rear of the axis 144a of the crankshaft 144, a distance L2 between the axis 173c and the axis 144a becomes longer than a distance L1 between the axis 73c and the axis 44a, which is shown in FIG. 15. Therefore, the crankshaft 144 and the gear change mechanism 170, which are heavyweight objects, end up being located away from each other. Consequently, the mass tends to be dispersed.

Figure 18:
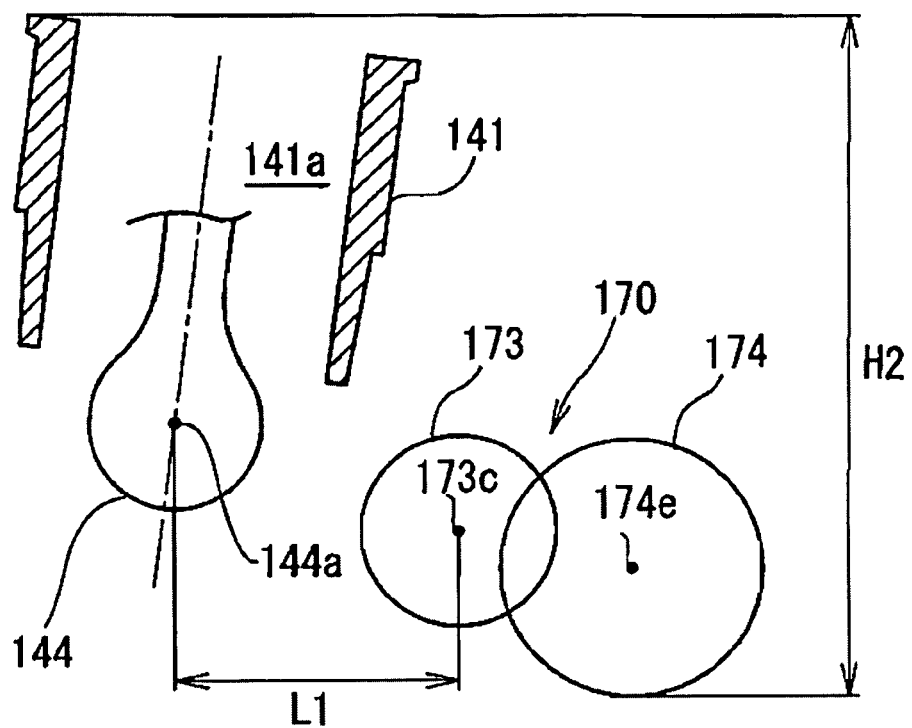
FIG. 18 is a conceptual view showing positional relationships among the cylinder body, the crankshaft, and the gear change mechanism in a third case where the cylinder is not offset.

Also, for example, as shown in FIG. 18, when the axis 173c of the main shaft 173 is disposed relatively lower, the distance between the crankshaft 144 and the main shaft 173 does not become longer. However, a distance H2 between an upper end of the cylinder body 141 and a lower end of the gear change mechanism 170 becomes longer than a distance H1 between the upper end of the cylinder body 41 and the lower end of the gear change mechanism 70, which is shown in FIG. 15. Consequently, the distance between the gear change mechanism 170 and the cylinder head becomes longer. Therefore, the mass tends to be dispersed.

As described above, it is difficult to concentrate the mass in the engine 15 merely with the rearward inclination of the cylinder 41a. In addition, the engine 15 tends to be enlarged in order to avoid positional interference between the cylinder 41a and the gear change mechanism 170.

In contrast, in the first embodiment as described above and as shown in FIG. 15, the cylinder 41a is inclined rearward while the cylinder 41a is offset. This makes the cylinder body 41 and the gear change mechanism 70 less likely to interfere with each other, in terms of location, even when the cylinder 41a is inclined rearward. Therefore, as shown in FIGS. 12 and 13, the cylinder head 42, which is attached to the upper end of the cylinder body 41, can be disposed as close to the gear change mechanism 70 as possible. Accordingly, the cylinder head 42, the crankshaft 44, and the gear change mechanism 70 can be disposed in proximity to each other. As a result, it is possible to concentrate the mass in the engine 15.

In addition, since the cylinder 41a is offset, it is possible to obtain the following three merits. The first merit is that side thrust and piston slap can be reduced, since a direction of motion of the piston 46 in an expansion stroke can be set relatively parallel to the connecting rod 45. The second merit is that it is possible to shorten the compression time while extending the expansion time. The third merit is that the process volume is increased. Therefore, the offset of the cylinder 41a allows a decrease in a diameter of the cylinder 41a if the engine displacement remains the same. Consequently, reduction in size and weight of the engine 15 is possible.

The offset amount, that is, a distance W between the straight line 44b and the straight line 41b shown in FIG. 13 is not limited to a particular value; however, it is preferably between 1 and 30 mm. It is more preferably between 5 and 20 mm and is still more preferably between 5 and 15 mm.

The preferable offset amount from a viewpoint of decreasing the side thrust varies in accordance with speed of the engine 15. More specifically, when the speed of the engine 15 is relatively low, such as 6000 rpm or less, it is preferable that the offset amount be large. On the other hand, when the speed of the engine 15 is relatively high, it is preferable that the offset amount be small. Therefore, the first embodiment as described above is particularly useful for an engine whose performance in a lower speed range is emphasized, and for a vehicle provided with such an engine. From the above viewpoint, it is especially useful for off-road vehicles and ATVs.

Also, since there is no need to move the arranged position of the gear change mechanism 70 rearward or downward, enlargement of the engine can be prevented. In addition, fuel efficiency can be improved by the offset.

The center of gravity of the motorcycle 1 can be shifted to the rear side with the rearward inclination of the cylinder 41a. Consequently, load distribution on the front wheel 13 decreases. Therefore, the invention is especially useful for a vehicle whose load distribution on the front wheel 13 is preferably decreased. More specifically, it is especially useful for off-road vehicles and the like.

As shown in FIGS. 13 and 15, in the above-described first embodiment, the lower end of the cylinder body 41 is located lower than the upper end of the gear change mechanism 70. Therefore, it is possible to decrease the distance between the cylinder head 42, which is attached to the upper end of the cylinder body 41, and the gear change mechanism 70, in a vertical direction. Accordingly, further concentration of mass can be realized.

When the lower end of the cylinder body 41 is located lower than the upper end of the gear change mechanism 70, positional interference between the gear change mechanism 70 and the cylinder body 41 becomes more likely to occur. Therefore, when the lower end of the cylinder body 41 is located lower than the upper end of the gear change mechanism 70, the offset of the cylinder 41a is especially effective.

As shown in FIGS. 13 and 15, in the above-described first embodiment, the upper end of the main shaft 73 is located higher than the axis 44a of the crankshaft 44. Therefore, for example, as compared to the case where the axis 44a of the crankshaft 44 is higher than the upper end of the main shaft 73, it is possible to shorten the distance between the cylinder head 42 and the gear change mechanism 70. Consequently, further concentration of mass can be realized.

As shown in FIG. 13, the axis 73c of the main shaft 73 is located above the straight line L passing through the axis 44a of the crankshaft 44 and the axis 74e of the drive shaft 74. Therefore, for example, as compared to the case where the axis 73c of the main shaft 73 is located on the straight line L, it is possible to shorten the distance between the drive shaft 74 and the crankshaft 44. Accordingly, further concentration of mass can be possible, and reduction in size of the engine 15 in a longitudinal direction can also be possible.

The foregoing describes a case wherein the axis 73c of the main shaft 73 is located above the straight line L; however, the axis 73c of the main shaft 73 may be located below the straight line L. The above-described effects can be obtained in such a case as well. In other words, it is preferable that the axis 73c of the main shaft 73 be not located on the straight line L.

In the first embodiment described above, the main frame 3 and the tank rail 4 are provided. As shown in, for example, FIG. 1, the main frame 3 is directly connected to the head pipe 2. The main frame 3 supports the rear arm 20 to which the rear wheel 21 is attached. The rear end of the tank rail 4 is connected to the main frame 3. Therefore, it is possible to connect the main frame 3, which supports the rear arm 20 to which the rear wheel 21 is attached, to the head pipe 2. In addition to this, the connection between the head pipe 2 and the main frame 3 can be reinforced. Therefore, it is possible to reinforce the connection between the main frame 3 for supporting the rear arm 20 and the head pipe 2 and to suppress an increase in the number of components of the body frame 9.

In the above-described first embodiment, the head pipe 2 is formed to extend rearward. As shown in, for example, FIG. 5, the head pipe 2 is formed to include the weld parts 2f, 2g to which the main frame 3 is connected. Therefore, it is possible to easily and directly connect the main frame 3 to the weld parts 2f, 2g of the head pipe 2.

Also, in the above-described first embodiment, and as shown in, for example, FIG. 2, the bosses 3g for supporting the engine 15 are integrally formed with the main frame 3. Therefore, as compared to the case where the bosses 3g for supporting the engine 15 are separately formed from the main frame 3, it is possible to prevent an increase in the number of components for supporting the engine 15.

In the above-described first embodiment and as shown in FIG. 6, the head pipe 2 is provided with the insertion hole 2a, in which the steering shaft 11 is inserted, and the recess 2h opening along the direction A in which the insertion hole 2a extends. Therefore, the head pipe 2 having the recess 2h can be easily formed by semi-solid die casting, using dies, by setting a direction in which the die is pulled out to the direction that the insertion hole 2a extends.

In the above-described first embodiment and as shown in, for example, FIGS. 2 and 3, the left frame 3a and the right frame 3b of the main frame 3 are arranged to extend rearward, with a predetermined spacing therebetween extending in a vehicle width direction in a plan view. In addition, the left frame 3a and the right frame 3b are arranged to assume a U-shape, in such a way that they approach each other toward the body section 2c of the head pipe 2. Therefore, it is possible to improve rigidity of the body frame 9 in a planar direction.

Figure 8:
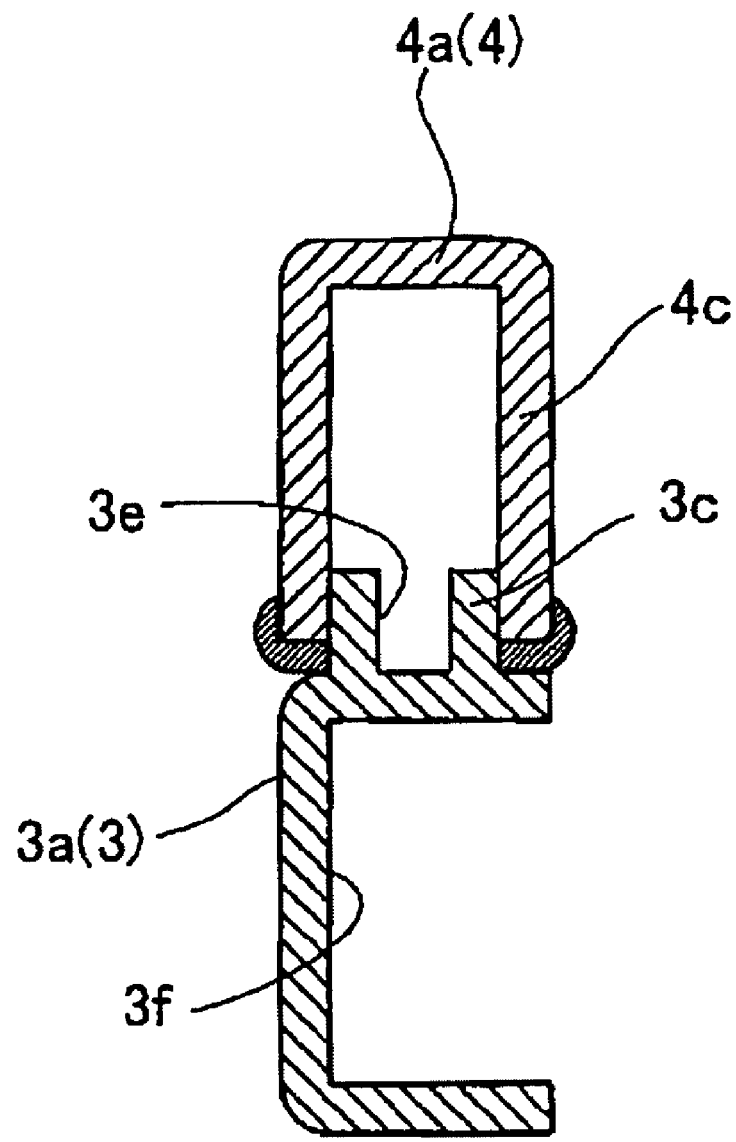
FIG. 8 is a side view taken along the cutout line 200-200 in FIG. 4.

In the above-described first embodiment and as shown in, for example, FIG. 8, the recess 3e is formed in each of the connections 3c, 3d of the main frame 3. More specifically, the recess 3e is formed inside the portion of each of the connections 3c, 3d, which is fitted to the tank rail 4. Therefore, it is possible to reduce the weight of the main frame 3.

In the above-described first embodiment, the main frame 3 and the head pipe 2 are formed by semi-solid die casting. Therefore, it is possible to reduce sizes and weights of the main frame 3 and the head pipe 2 in comparison with a case where the main frame 3 and the head pipe 2 are formed by forging or regular die casting.

Parts made by forging are less flexible and less accurate in shape than those made by semi-solid die casting. Therefore, when the main frame 3 and the head pipe 2 are formed by forging, it is difficult to form the main frame 3 and the head pipe 2 in a shape of a recess (U-shape) or in a shape that has a predetermined strength. It is necessary to thicken the main frame 3 and the head pipe 2 if they are made by forging. As a result, the main frame 3 and the head pipe 2 tend to be enlarged, and thus the weights of the main frame 3 and the head pipe 2 tend to increase.

If the main frame 3 and the head pipe 2 are formed by common die casting, they will be weaker than those formed by semi-solid die casting. Consequently, it is necessary to thicken the main frame 3 and the head pipe 2 give them a predetermined strength. Therefore, the size and weight of the head pipe 2 tends to increase.

A motorcycle 1 has been described above as one example of a vehicle in which an embodiment of the invention can be realized. However, concentration of mass in the engine is an objective common to vehicle engines generally. Therefore, the engine of the invention may be mounted in a vehicle other than a motorcycle.

It has to be noted, however, that a space for mounting the engine 15 is smaller in a straddle-type vehicle than in a four-wheeled automobile. In addition, relatively higher motion performance is desired for a straddle-type vehicle. In a motorcycle, a space for mounting the engine 15 is especially small. Therefore, concentration of mass according to the first embodiment of the invention as described above is especially useful for motorcycles. Further, since higher motion performance can be realized with concentration of mass according to the above-described first embodiment, the embodiment especially useful for off-road vehicles and ATVs.

Second Embodiment

In the above description relating to a first embodiment, only the kick pedal 77 shown in FIG. 14 is provided as a starter of the engine 15. However, the invention is not limited to this construction. For instance, in a second embodiment, a starter motor 80, as shown in FIGS. 19 and 20, may be disposed as a starter either with the kick pedal 77 or without the kick pedal 77.

Figure 19:
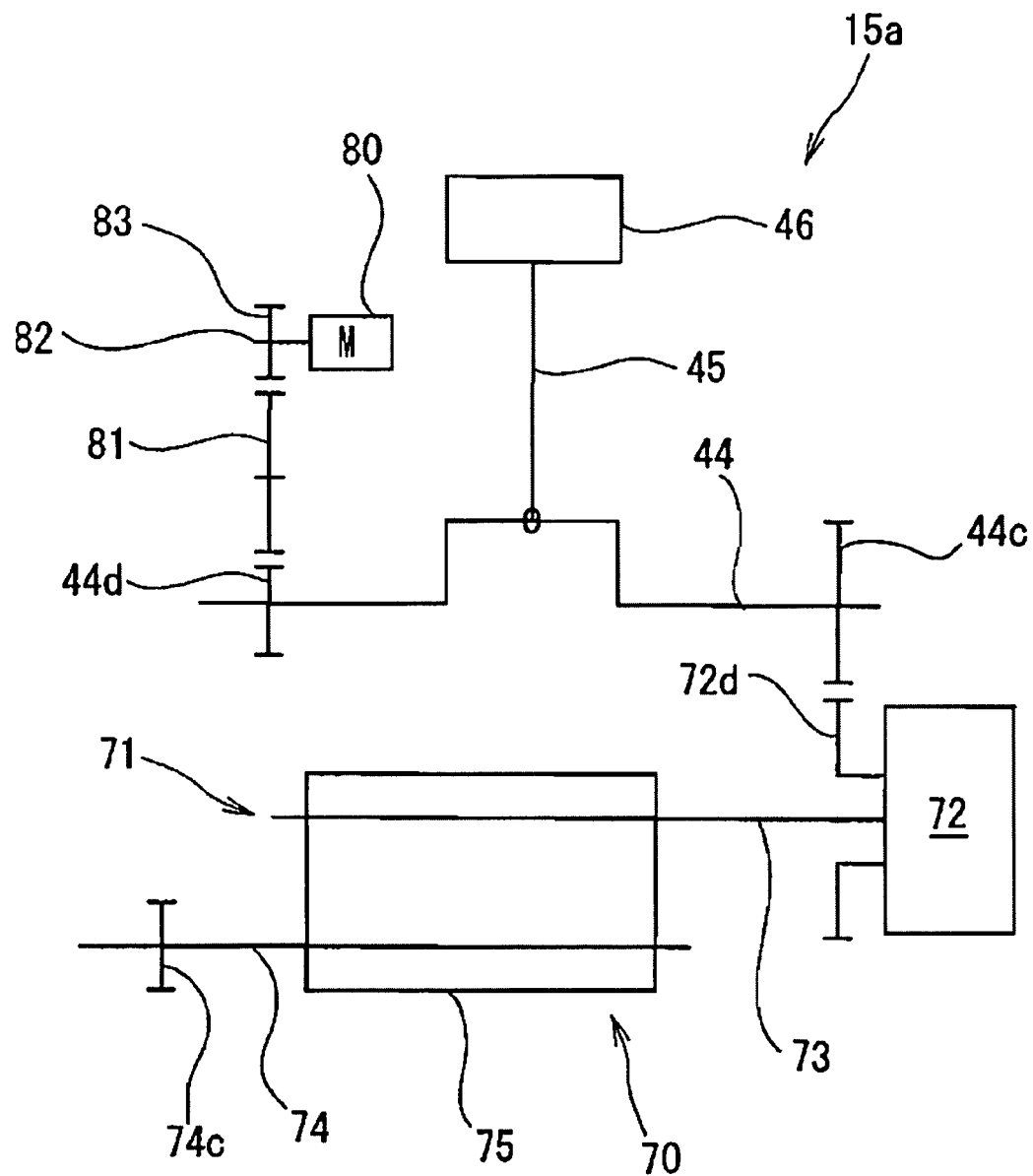
FIG. 19 is a schematic conceptual view showing the engine structure according to a second embodiment.
Figure 20:
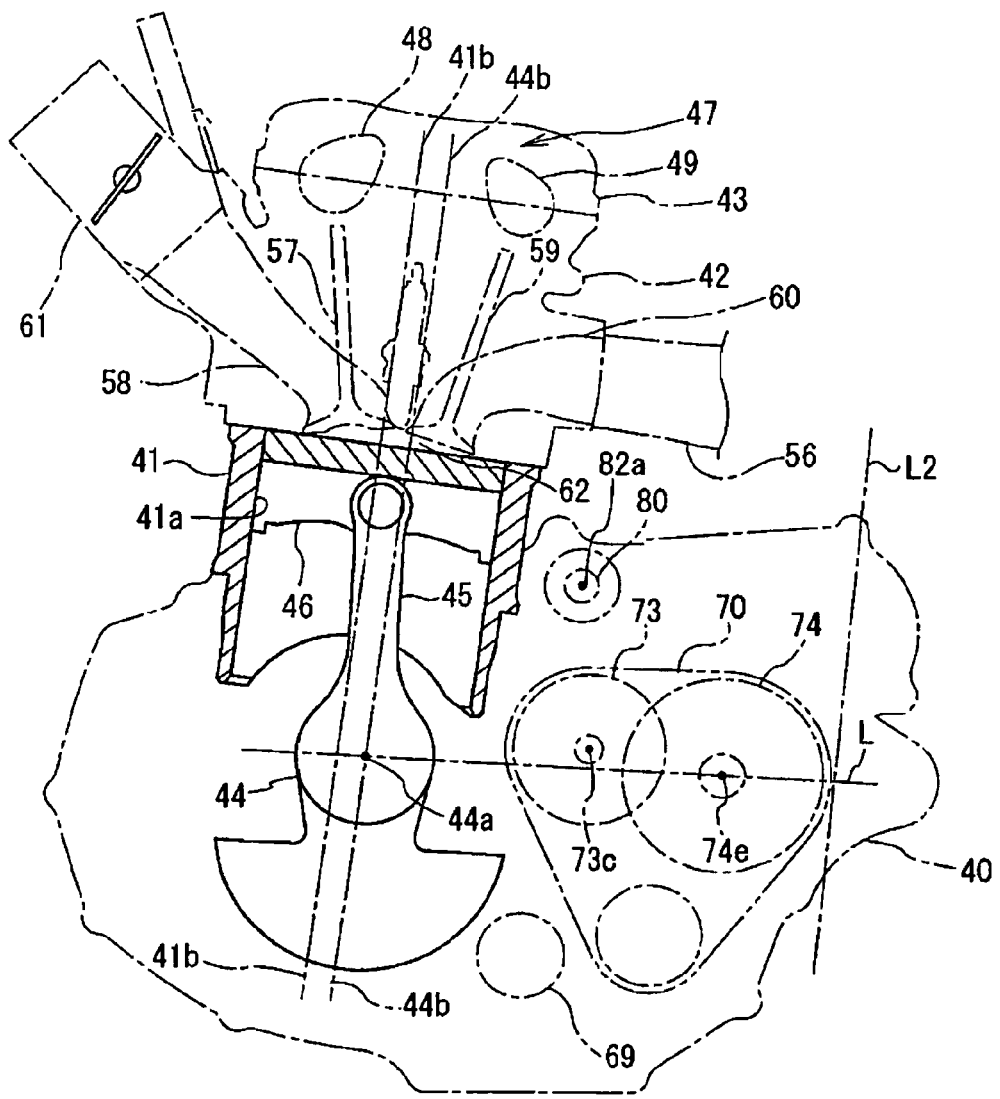
FIG. 20 is a schematic side view showing the engine structure according to the second embodiment.

FIG. 19 is a schematic conceptual view showing structure of an engine 15a according to the second embodiment. FIG. 20 is a schematic side view showing the structure of the engine 15a according to the second embodiment. Descriptions will hereinafter be made of the engine 15a according to the second embodiment with reference to FIGS. 19 and 20.

In the following descriptions, components having substantially the same mechanism as those in the above-described first embodiment are designated by the same reference numerals, and their description is omitted.

As shown in FIG. 19, a one-way gear 44d is provided on the left end of the crankshaft 44 in the second embodiment. This gear 44d meshes with a starter gear 83 through an idle gear 81. The starter gear 83 is attached to a rotary shaft 82 of the starter motor 80. Therefore, when the rotary shaft 82 of the starter motor 80 rotates, rotation thereof is transmitted to the crankshaft 44 via the starter gear 83, the idle gear 81, and the one-way gear 44d.

Next, the arrangement of each constructional member of the engine 15a of the second embodiment will be described with reference to FIG. 20. As shown in FIG. 20, the starter motor 80 is located above the gear change mechanism 70 and to the rear of the cylinder body 41. In detail, an axis 82a of the rotary shaft 82 (see FIG. 19) of the starter motor 80 is located above the gear change mechanism 70 and to the rear of the cylinder body 41. In more detail, the starter motor 80 is located above the main shaft 73 in the second embodiment. The axis 82a is located forward of the rear end of the gear change mechanism 70, and forward of the axis 74e of the drive shaft 74.

The center of gravity of the engine 15a can be brought closer to the starter motor 80 by disposing the starter motor 80 above the gear change mechanism 70 and to the rear of the cylinder body 41 as described above. Therefore, it is possible to further concentrate the mass in the engine 15a.

It is preferable that the axis 82a of the rotary shaft 82 of the starter motor 80 be located within an area surrounded by the straight line L, the straight line 44b, and a tangent L2 to an outline of the drive shaft 74 at the rear end of the drive shaft 74 on the straight line L. Then, it is possible to further concentrate the mass in the engine 15a.

By the way, the starter motor 80 is located outside the crankcase 40. In detail, it is located on top of the crankcase 40. One end of the rotary shaft 82 of the starter motor 80 is inserted inside the crankcase 40 and is connected with the starter gear 83 located inside the crankcase 40.

<Modification>

In the above-described first and second embodiments, the engine 15 or 15a is described as being, for example, a single-cylinder engine. However, the engine 15 or 15a may be an in-line multi-cylinder engine as shown in FIG. 21.

Figure 21:
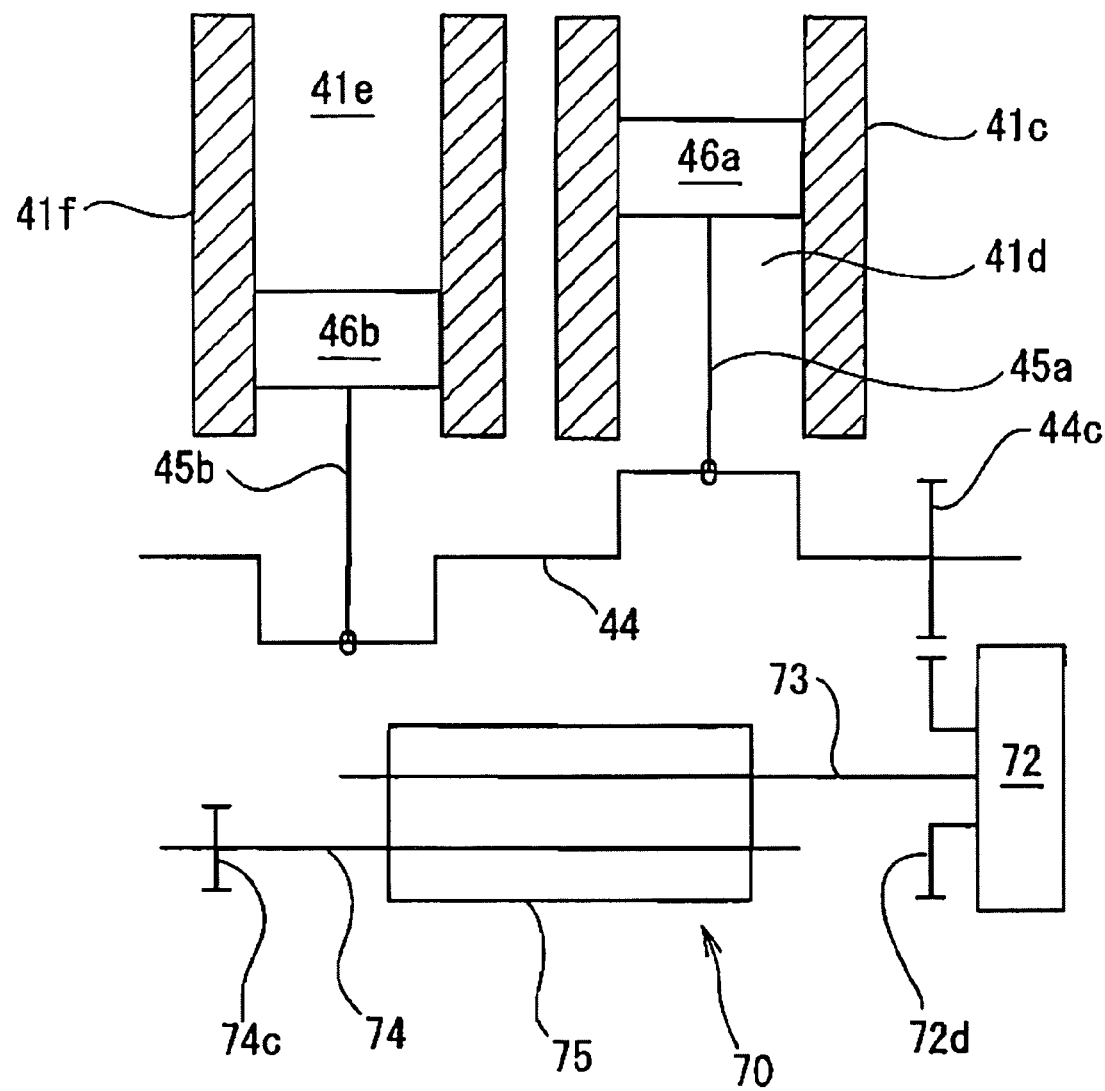
FIG. 21 is a conceptual view showing a structure of main parts of an engine according to a modification.

More specifically, two connecting rods 45a, 45b are connected to the crankshaft 44 in FIG. 21. A piston 46a is attached to an end of the connecting rod 45a. The piston 46a is housed in a cylinder 41d formed in a cylinder body 41c. A piston 46b is attached to an end of the connecting rod 45b. The piston 46b is housed in a cylinder 41e formed in a cylinder body 41f.

Now, it should be understood that the embodiments disclosed herein are given as mere illustrations in all respects, but not given to impose any limitation. The scope of the invention is not defined by the descriptions of the above embodiments, but defined by the scope of the claims, and includes all modifications that fall within the meaning and scope equivalent to the scope of the claims.

In the above-described embodiments, the example in which the main frame is directly connected to the head pipe is described. However, the invention is not limited thereto. The weld part as a frame fixing part may be separately formed from the head pipe, and the main frame may be connected to the head pipe via the weld part.

In the above-described embodiments, the example in which the head pipe and the main frame are formed by semi-solid die casting is described; however, the invention is not limited to this configuration. The head pipe and the main frame may be formed by a method other than semi-solid die casting. For example, the head pipe and the main frame may be formed by forging or common die casting.

In the above-described embodiments, the example in which the rear suspension bracket is composed of the cross pipe formed by extrusion and the attachments welded to the cross pipe has been described. However, the invention is not limited thereto. The rear suspension bracket may be formed by semi-solid die casting. This allows simultaneous forming of the cross pipe and the attachments.

In the above-described embodiments, the example in which the head pipe and the main frame are formed to have a U-shape in cross section has been described; however, the invention is not limited thereto. The head pipe and the main frame may be formed to not have a U-shape in cross section.

Concerning the above-described embodiments, an example in which the fuel tank is supported by the tank rail as the second frame connected to the head pipe and the main frame has been described. However, the invention is not limited thereto. The fuel tank may be supported by the main frame as the first frame.

What is claimed is:

1. A single-cylinder or in-line multi-cylinder engine comprising:
   a crankshaft;
   a piston connected to the crankshaft;
   a cylinder body in which a cylinder housing the piston is formed;
   a cylinder head mounted on an end of the cylinder body; and
   a gear change mechanism located to a rear of the crankshaft,
   wherein an axis of the cylinder extends upward obliquely to the rear from a crankshaft side and passes in front of an axis of the crankshaft when viewed from a direction in which the crankshaft extends.

2. The engine according to claim 1, wherein a lower end of the cylinder body is positioned lower than an upper end of the gear change mechanism.

3. The engine according to claim 1, wherein the gear change mechanism includes:
   a main shaft to which rotation of the crankshaft is input, and having a first shift gear group; and
   a drive shaft located to the rear of the main shaft and having a second shift gear group meshed with the first shift gear group, wherein an upper end of the main shaft is located higher than the axis of the crankshaft.

4. The engine according to claim 1, wherein the gear change mechanism includes:
   a main shaft to which rotation of the crankshaft is input, and having a first shift gear group; and
   a drive shaft located to the rear of the main shaft, and having a second shift gear group meshed with the first shift gear group, wherein an axis of the main shaft is located above a straight line passing through the axis of the crankshaft and the drive shaft.

5. The engine according to claim 1, further comprising:
   a starter motor for transmitting rotation to the crankshaft, and having a rotary shaft and a starter gear attached to the rotary shaft, wherein an axis of the rotary shaft is located above the gear change mechanism and to the rear of the cylinder body.

6. A straddle-type vehicle comprising the engine according to claim 1.

7. The straddle-type vehicle according to claim 6, further wherein the rear of the crankshaft is towards a rear of the straddle-type vehicle.

8. The engine according to claim 1, wherein the rear of the crankshaft is towards a rear of the engine.

9. The engine according to claim 1, wherein the crankshaft axis extends in a width direction of the engine.

10. The engine according to claim 1, wherein the cylinder axis does not intersect the crankshaft axis.

11. The engine according to claim 10, wherein a distance between the axis of the cylinder and a line parallel to the axis of the cylinder that intersects the axis of the crankshaft is between 1 and 30 mm.

12. The engine according to claim 11, wherein the distance is between 5 and 20 mm.

13. The engine according to claim 11, wherein the distance is between 5 and 15 mm.

* * * * *